US006520641B1

(12) United States Patent
Walton et al.

(10) Patent No.: US 6,520,641 B1
(45) Date of Patent: *Feb. 18, 2003

(54) SHOOTING A MOTION PICTURE SCENE WITH A SELF-PROPELLED CAMERA DOLLY

(75) Inventors: Barry Walton, Culver City, CA (US); Bill Schultz, Torrance, CA (US); David Cornelius, Burbank, CA (US); Chris Barker, Culver City, CA (US)

(73) Assignees: Sony Corporation, Tokyo (JP); Sony Picture Image Works, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,709

(22) Filed: May 15, 2000

Related U.S. Application Data

(63) Continuation of application No. 08/774,789, filed on Dec. 30, 1996, now Pat. No. 6,264,330.

(51) Int. Cl.⁷ .............................................. G03B 17/00
(52) U.S. Cl. ....................................... 352/243; 396/428
(58) Field of Search ........................... 352/53, 132, 243; 396/419, 428; 104/118, 119, 243, 245, 246; 105/141, 169, 170, 215.1

(56) References Cited

U.S. PATENT DOCUMENTS

| 609,164 A | 8/1898 | Prescott |
| 3,452,683 A | 7/1969 | Grebe ........................... 105/29 |
| 3,598,355 A * | 8/1971 | English ........................ 396/428 |
| 3,739,479 A | 6/1973 | Blatherwick .................. 33/125 |
| 3,807,312 A | 4/1974 | Flodell ........................ 104/147 |
| 3,958,682 A | 5/1976 | Martin ......................... 198/19 |
| 4,398,469 A | 8/1983 | Zelli ........................... 105/170 |
| 4,498,744 A | 2/1985 | Ealovega et al. .............. 352/89 |
| 4,515,455 A * | 5/1985 | Northmore .................. 352/243 |
| 4,579,434 A * | 4/1986 | Grigg ......................... 352/243 |

(List continued on next page.)

FOREIGN PATENT DOCUMENTS

| GB | 793436 | * | 4/1958 | |
| GB | 2050975 | * | 3/1981 | |
| GB | 2 277 69 A | | 10/1994 | ............. B61B/3/02 |
| WO | WO 85/05336 | | 12/1985 | ........... B16B/12/13 |
| WO | WO92/02871 | * | 2/1992 | |

*Primary Examiner*—Alan A. Mathews
(74) *Attorney, Agent, or Firm*—Blakely Sokoloff Taylor & Zafman LLP

(57) ABSTRACT

The invention includes a method of shooting a scene in a motion picture. A track is provided as including two outer rails and a center rail. The center rail is located somewhere between the two outer rails. The center rail includes a top, a first side, and a second side. A self-propelled camera positioning device is also provided. The self-propelled camera positioning device includes a camera support unit having wheels and a camera.

The self-propelled camera positioning device also includes a drive unit coupled to the camera support unit. The drive unit includes at least one drive roller, two guide rollers positioned adjacent to the at least one roller. The guide rollers are biased against the first side and the second side of the center rail. The wheels on the two outer rails are positioned on the two outer rails. The camera support unit is moved along the track to define information of the motion. This information is stored. A scene is shot by operating the camera while moving the camera support unit along the track as a function of the stored information of the motion.

9 Claims, 6 Drawing Sheets

U.S. PATENT DOCUMENTS

| | | | |
|---|---|---|---|
| 4,631,404 A | 12/1986 | Burkhardt et al. | 250/237 G |
| 4,699,484 A | 10/1987 | Howell et al. | 352/243 |
| 4,943,821 A * | 7/1990 | Gelphman et al. | 396/428 |
| 4,950,126 A | 8/1990 | Fabiano et al. | 414/590 |
| 4,989,823 A * | 2/1991 | Chapman | 248/638 |
| 5,008,804 A * | 4/1991 | Gordon et al. | 352/243 |
| 5,037,068 A * | 8/1991 | Grottesi | 254/8 B |
| 5,220,848 A | 6/1993 | Basilico | 74/471 X |
| 5,457,370 A * | 10/1995 | Edwards | 318/571 |
| 5,609,108 A * | 3/1997 | Chapman | 105/170 |
| 5,784,966 A * | 7/1998 | Brown | 352/243 |
| 6,264,330 B1 * | 7/2001 | Walton et al. | 352/243 |

* cited by examiner

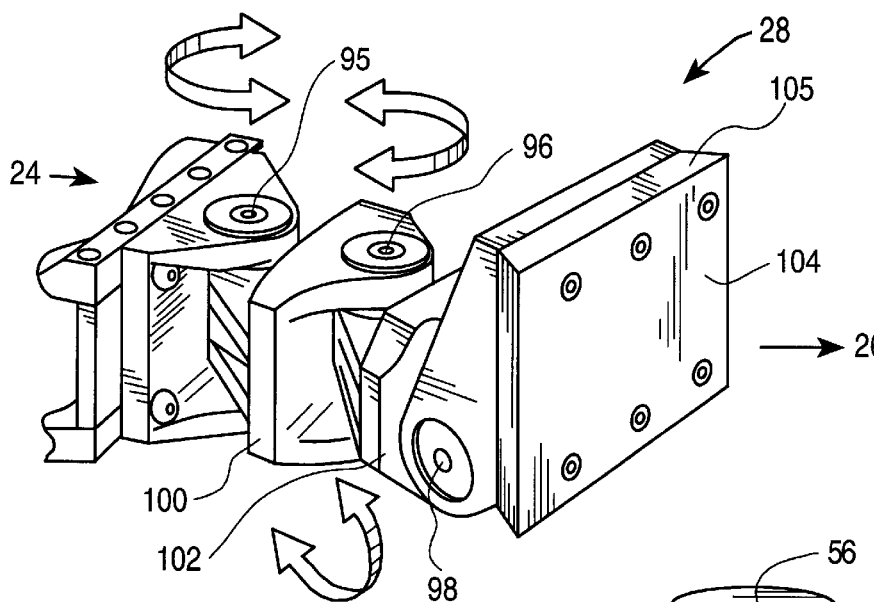
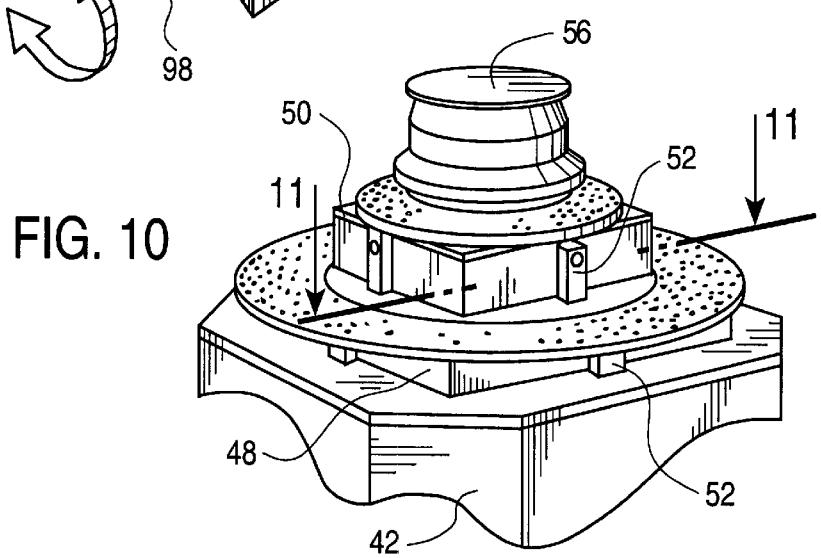
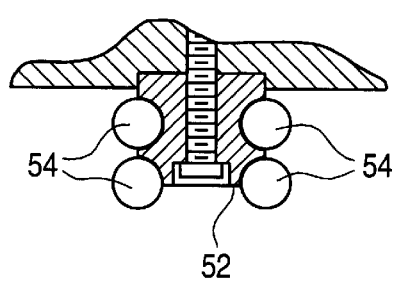
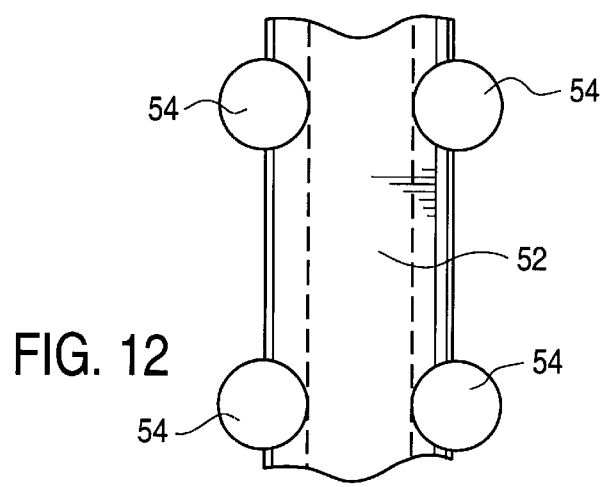
FIG. 9
FIG. 10
FIG. 11
FIG. 12

SHOOTING A MOTION PICTURE SCENE WITH A SELF-PROPELLED CAMERA DOLLY

This patent is a continuation of a prior application having the Ser. No. 08/774,797, now U.S. Pat. No. 6,264,330 filed Dec. 30, 1996.

BACKGROUND OF THE INVENTION

1. Field of the Invention

The present invention relates generally to the field of motion picture production systems, and more particularly, to an improved apparatus for positioning a camera for motion picture photography.

2. Description of the Related Art

Special effects have played an important role in motion picture productions since the early days of the film industry. In recent years, numerous box office hits testify to the captivating power of special effects, and underscore the significance of special effects in contemporary film making. With each new motion picture production, the film makers are pushing the envelope to out do the last production in special effects. State of the art digital technologies have become a significantly part of special effects. For example, the quality of an image obtained by composite photography may be significantly improved by using digital processes in putting together the image.

While modern digital technologies may allow compositing two or more image elements in a seamless manner to create a stunning visual effect with a realistic "feel", there are times when there is no substitution for the real expressions and movements of the actors. For example, for an action scene in which it is intended to show a lion pursuing and ferociously tackling a man to the ground, the lion does not have to be taught its natural terrifying behavior and it would be counter productive for anyone to try to teach the lion to act any differently against its nature. For obvious safety reasons, the action sequence for the lion must be filmed separately from that of its victim. The two action sequences may then be digitally composited in the film studio to create the deadly encounter on screen. Given that successful compositing requires elements of the scene to be perfectly matched, the proper positioning of the camera is important to accomplish this end. It has been a challenge to ensure that this can be accomplish with the separate camera takes.

In the past, movie cameras have been mounted on dollies which are provided with wheels, which move on the ground or along tracks having two parallel rails. The dollies may be pushed along the tracks during filming, or they may be self-propelled. While the prior art dollies allow easy movement and positioning of the cameras, they were not satisfactory in ensuring precise and repeatable camera positioning for composite shots. Further, the movement of the prior art dollies were accompanied by vibrations and noise, which are undesirable to filming. These undesirable effects are more pronounced when the dollies negotiate turns along curve section of the tracks. For example, the model "Super Panther" dolly made by Panther of Germany and distributed by Shopmaker Company was found to be unacceptable for filming scenes in which it is critical to minimize vibrations and noise. Furthermore, the structure of the Panther dollies was found to deflect under the weight of the camera gear, to an extent as to be unacceptable for precision positioning of the camera.

SUMMARY OF THE INVENTION

The present invention is directed to an improved self-propelled camera positioning device (hereinafter referred to as a "dolly") which is configured to minimize noise and vibration during its movement on a track. The dolly rides on a track which comprises three rails, with the drive wheels of the dolly riding on the center rail. In a preferred embodiment, the dolly comprises a camera support unit and a drive unit which are coupled by a flexible coupling. The flexible coupling comprises segments coupled by three hinges at a horizontal axis and two vertical axes, thereby allowing the coupling freedom to flex. The support unit is designed with outer wheels which run along a pair of parallel rails of the track. The drive unit has a set of drive rollers which run along a center rail between the two outer rails of the track, thereby pulling and pushing the support unit along the track. One of the drive rollers is powered by a motor, which is controlled by a programmable controller. In a specific embodiment of the present invention, a pinch mechanism biases the drive wheels against the sides of the center rail. All the wheels and rollers on the dolly are provided with a resilient rolling surface.

The structure of the dolly is configured to minimize any undesirable structural deflections under the load of the camera gear. The flexible coupling is designed with no free play in the hinges. The dolly is designed to be disassembled into several pieces for ease of shipping and reassembled without the use of separate hand tools. Quick detach couplings are implemented for coupling the pieces of the dolly.

In another aspect of the present invention, the controller is programmed through the movement of the dolly. The controller memorizes the movement of the dolly so that such movement may be repeated with precision to reposition the camera to retake the scene or to go through precisely the same camera motions with a different scene element for compositing an image.

BRIEF DESCRIPTION OF THE DRAWINGS

FIG. 9 is a perspective view of the flexible coupling between the drive unit and the camera support unit.

FIG. 10 is a perspective view of the telescopic pedestal of the camera support unit of the camera dolly.

FIG. 11 is a sectional view of the guide rail of the pedestal taken along line 11 in FIG. 10.

FIG. 12 is a schematic view showing the guide rail and its guide rollers.

DESCRIPTION OF THE ILLUSTRATED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims.

Figure 1:
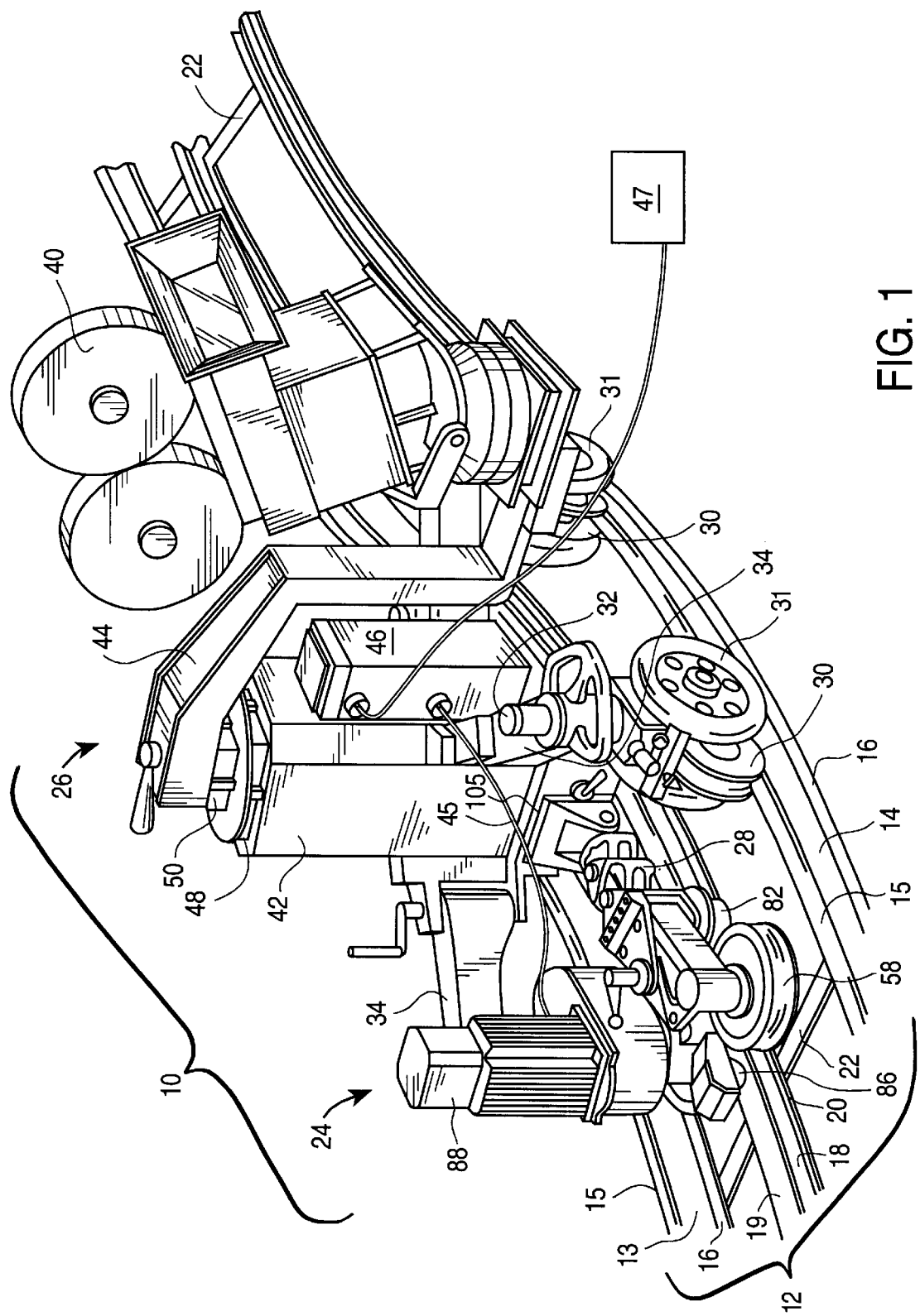
FIG. 1 is a perspective view of a camera dolly and rail system in accordance with one embodiment of the present invention.

FIG. 1 illustrates the overall configuration of the self-propelled camera dolly 10 in accordance with one embodiment of the present invention. The dolly 10 is designed to operate on a three-rail track system 12. In the specific embodiment illustrated, the outer parallel rails 13 and 14 are about 23 inches apart, each with a 1.375 inches diameter round contact surface 15 for the wheels. The round contact surface 15 is elevated from the base 16 by several inches. The center rail 18 has a 1.5 inch diameter cross-section, with a round contact surface 19 which is elevated from the base 20 (see also FIG. 5). The three rails 13, 14 and 18 are spaced apart by spacing bars 22. In the illustrated embodiment, the center rail 18 is positioned along the center line of the track 12. However, it is to be understood that the term "center" is used loosely herein to designate that the center rail 18 is between the outer rails 13 and 14, and is not intended to be a limitation. The center rail 18 may be positioned off the center line without departing from the scope and spirit of the present invention. Given the track and rail dimensions, the track 12 may comprise curve sections which may have a curvature of eight-foot radius or more measured with respect to the track center line. It has been found that for the given track dimensions, the dolly 10 designed in accordance with the present invention as more fully described below can effectively negotiate at least an eight-foot radius curve measured with respect to the track center line. The dolly 10 comprises primarily two sections, a drive unit 24 and a camera support unit 26, which are coupled by a flexible coupling 28. The camera support unit 26 of the dolly 10 rides on four pairs of free spinning wheels 30 along the outer rails of the track. Each pair of wheels 30 are in line along the rail 13 or 14 and are supported to swivel about a vertical axis 32. The pair of wheels 30 are horizontally offset from this axis 32 in the rail direction, much like a caster wheel configuration.

The camera support unit 26 supports a motion picture camera 40 (such as a Panavision type camera) on a telescopic pedestal 42, either directly or by way of an extension arm 44 which more appropriately positions the camera 40 at a desired camera angle to suit the requirement of a particular scene. The camera 40 may include conventional motor driven zoom, focus, pan and tilt mechanisms. The telescopic extensions are driven to move by a conventional motor means not shown in the figures. Some of the electronics for controlling the various motor functions (including the drive unit motor 89 via cable 45) may be contained in a box 46 attached to the side of the telescopic pedestal 42. The box 46 may be electrically connected via a flexible cable to a controller 47.

The extension arm 44 as shown in FIG. 1 supports the camera 40 at a center line distance of 20 inches to the side of the pedestal 42. The telescopic pedestal 42 is designed with a 28-inch extension. It is noted that the camera 40 and other associated gears support by the arm 44 can be greater 200 pounds or more. This weight coupled to the distance of the arm from the pedestal, creates a large bending moment which can cause deflection of the telescopic structure, especially in its fully extended state. The telescopic structure is designed to withstand structural deflections in its fully extended position of less than one-eighth of an inch under a 250 pounds load applied at the end of a 20-inch extension arm 44. This is accomplished by providing two stages of telescopic extensions 48 and 50, each stage covering half of the total overall extension. The first extension 48 slides within the base of the pedestal 42, and the second extension 50 slides within the first extension 48.

As is more clearly shown in FIGS. 10 to 12, the rigidity of the extensions 48 and 50 is improved by using bearing supported rails 52 at the four sides of each extension. Referring to the sectional diagram of FIG. 11, more specifically at each rail 52, there is a bearing 54 (e.g., the "THK" type bearing) adjacent to each corner of the rail. There are bearings along the length of the rails. This structure minimizes the free-play at the bearing and track interface, and hence the sideways deflections of the telescopic extensions 48 and 50.

Also more clearly shown in FIG. 10 is the stub 56 at the top of the telescopic extension 50. This is a configured for a quick release coupling to the extension arm 44 or to the camera 40 (e.g., by means of a standard Panther mount) The end of the extension arm 44 also has a similar stub (not shown in the figures) for coupling to the camera 40. The extension arm 44 may be positioned with respect to the camera support unit 26 as shown in FIG. 1, or it may be positioned to extend from the two other sides of the camera support unit 26 that are not above the flexible coupling 28 to the drive unit 24.

Figure 2:
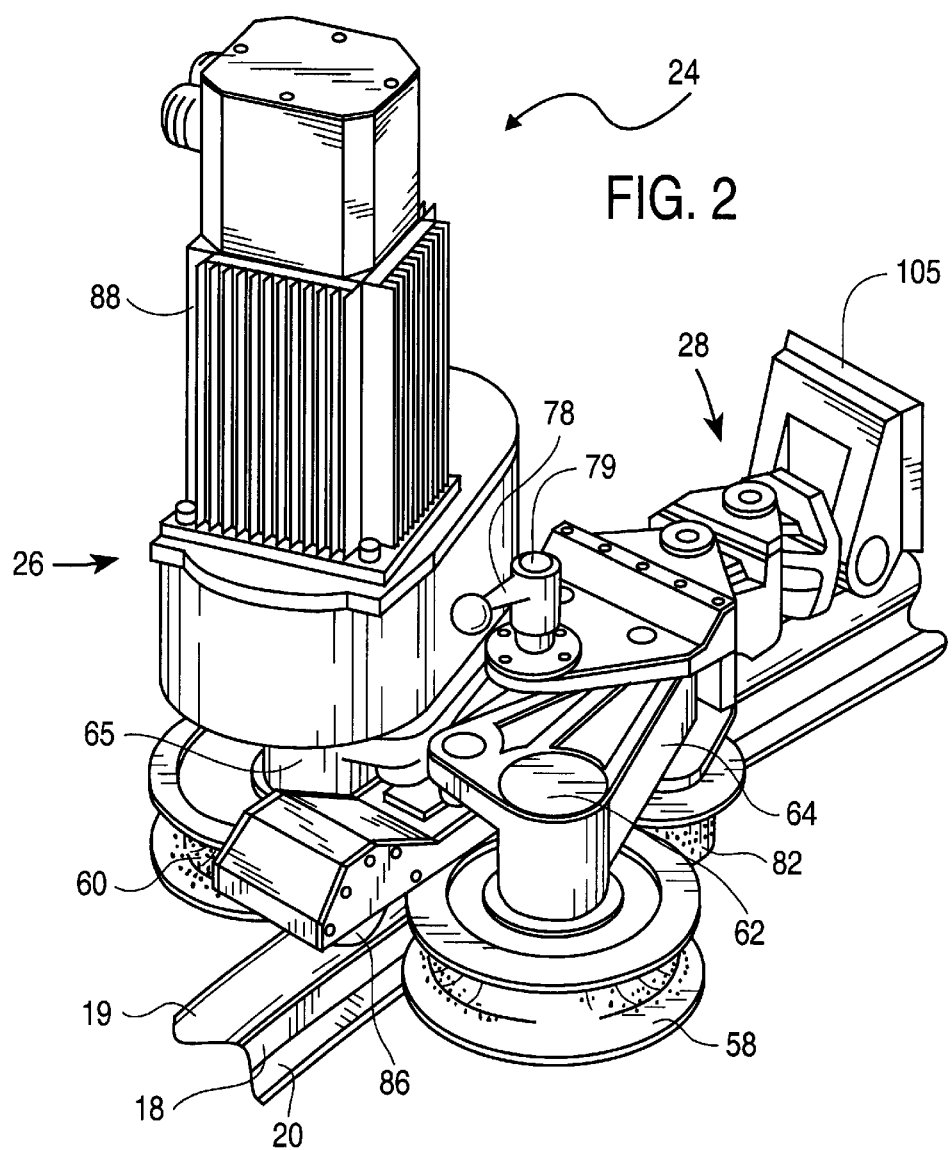
FIG. 2 is a perspective view of the drive unit of the camera dolly in FIG. 1.

The propulsion of the dolly 10 is provided by the drive unit 24. Referring to FIG. 2, the drive unit 24 comprises a pair of drive rollers 58 and 60 which are configured to rotate about vertical axes 62 (see FIG. 3 and FIG. 5) on either side of the center rail 18 of the track 12. The drive rollers 58 and 60 are about 6 inches in diameter. The contact surfaces 641 of the drive rollers 58 and 60 are concave semi-circular (see FIG. 5).

Figure 5:
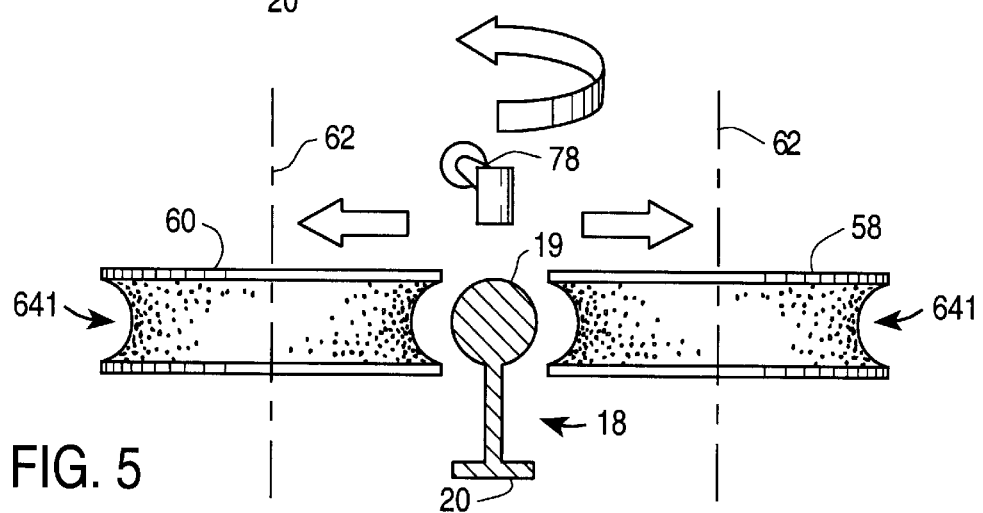
FIG. 5 is a sectional view taken along line 4—4 in FIG. 3 showing the drive rollers in a disengaged state.
Figure 3:
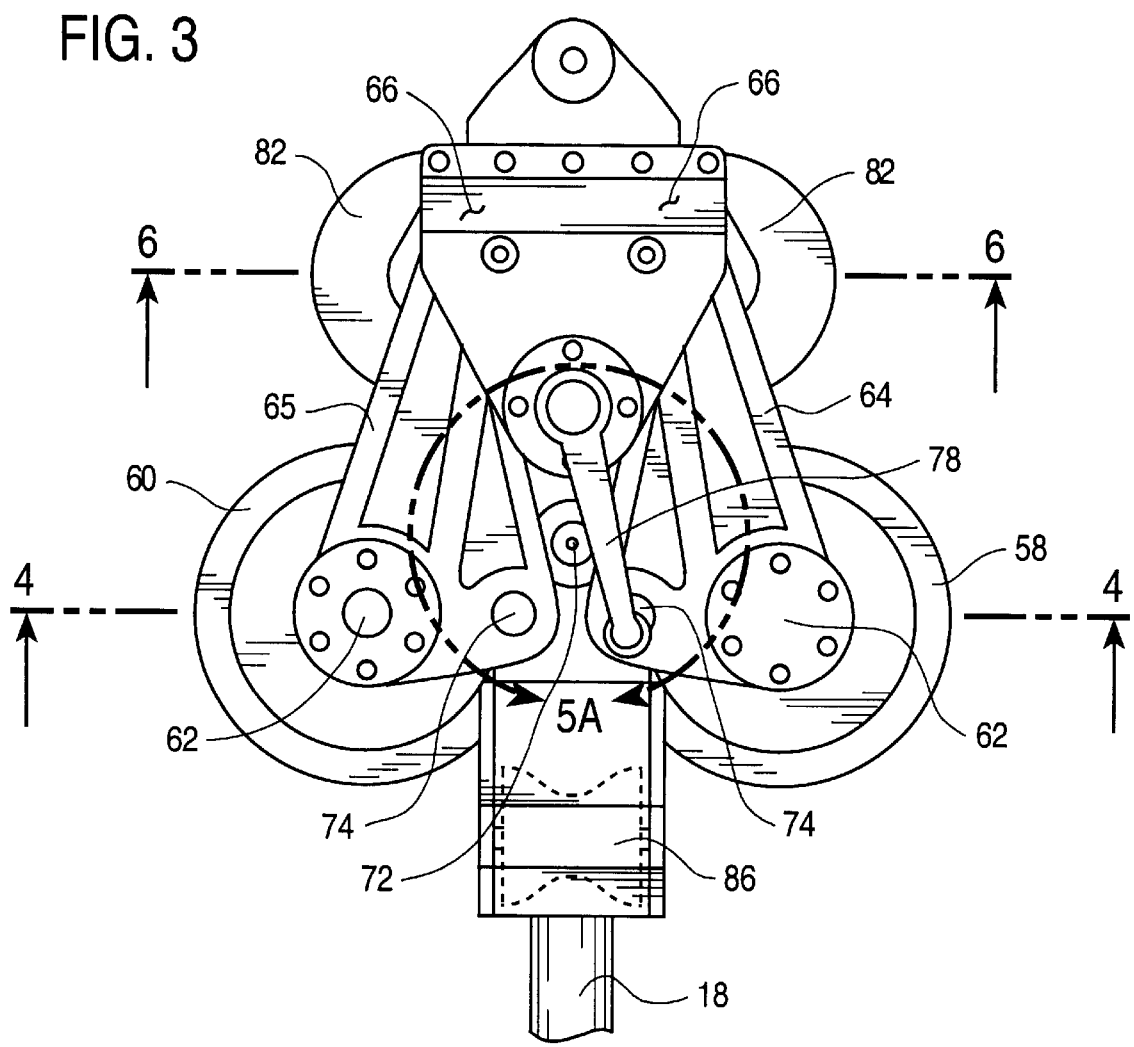
FIG. 3 is a top view of the drive rollers of the drive unit.
Figure 4:
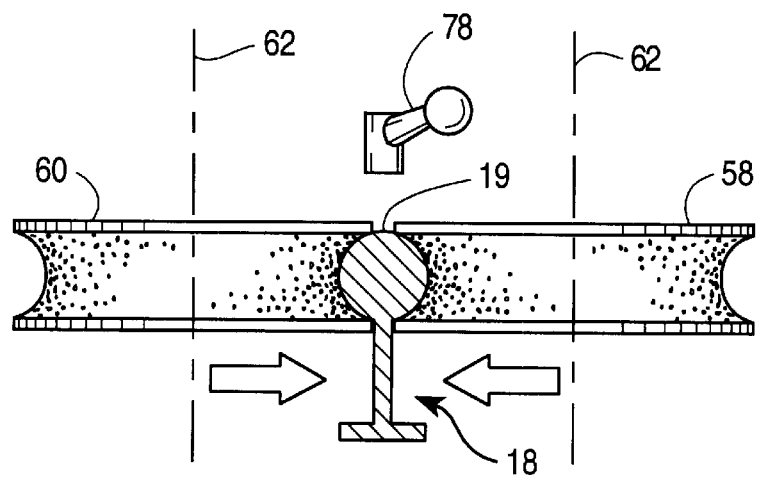
FIG. 4 is a sectional view taken along line 4—4 in FIG. 3 showing the drive rollers in an engaged state.
Figure 5A:
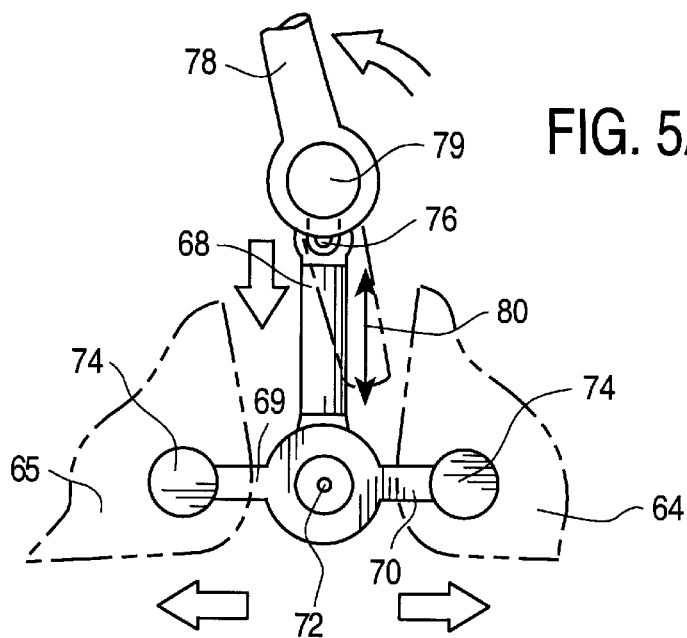
FIG. 5A is a partial top view illustrating disengagement of the drive rollers.

The drive rollers 58 and 60 are pivotally supported in a manner such that it can be moved between a engaged position (FIGS. 3 and 4) and a disengaged position (FIGS. 5 and 5A). Specifically, the drive rollers 58 and 60 are supported by a pair of pivot arms 64 and 65 which pivots about 66. As is more clearly showed in FIG. 5A, one end of a lever 68 is rotatably coupled to two short arms 69 and 70 at a hinge 72. The arms 69 and 70 are connected to the pivot arms 64 and 65 via hinges 74 as shown in FIG. 3. The lever 68 of FIG. 5A is coupled at its other end via a hinge 76 to a rotatable handle 78 (about axis 79) in a slightly offset manner, such that when the handle 78 is turned, the lever 68 is caused to move along the direction 80.

FIG. 3 shows the state in which the drive rollers 58 and 60 are clamped onto the center rail 18. In this state, the handle 78 is turn to. pull the lever 68 upward as shown in the FIG. 3. As the lever 68 moves, the ends of the arms 69 and 70 (more clearly shown in FIG. 5A) coupled to the pivot arms 64 and 65 (more clearly shown in FIG. 5A) are moved closer while the pivot arms 64 and 65 pivot about the axes 66, thereby clamping the drive rollers 58 and 60 against the center rail 18. The lever 68 and arms 69 and 70 form an inverted "Y" configuration. The handle 78 comes to a locking stop when the drive rollers fully engage the center rail. To disengage the drive rollers 58 and 60, the handle 78 is rotated in an anti-clockwise direction, thereby pushing the lever 68 downwards as shown in FIG. 5A. The ends of the arms 69 and 70 push the pivot arms 64 and 65 to cause them to pivot away from the center rail 18, thereby disengaging the drive rollers 58 and 60 from the center rail 18. In the disengaged state, the lever 68 and arms 69 and 70 are in an inverted "T" configuration. In the disengaged state, the circumferential edges of the drive rollers 58 and 60 clears the sides of the center rail 18 in the vertical direction (which allows the drive rollers to be lifted vertically off the track, which will be discussed below).

Figure 6:
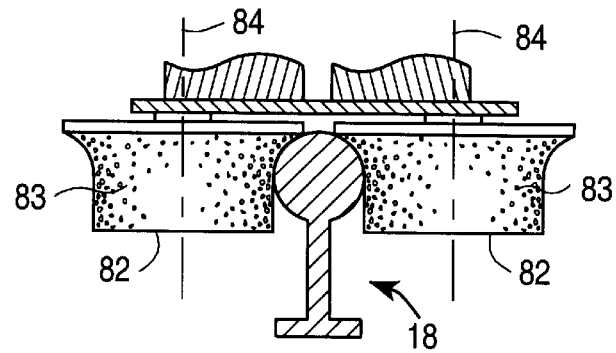
FIG. 6 is a sectional view taken along line 6—6 in FIG. 3 showing the guide rollers in the drive unit.

A pair of guide rollers 82 are provided to assist in tracking the drive unit 24 along the center rail 18. As shown in FIG. 6, the guide rollers 82 are about 4 inches in diameter and shaped with a concave quarter round contact surface 83. The guide rollers 82 are positioned adjacent the drive rollers 58 and 60, one on each side of the center rail 18 and configured to freely rotate about vertical axes 84. The distance between the guide rollers 82 is fixed, with a snug fit engaging the center rail 18. With the drive rollers 58 and 60 clamped against the center rail 18; a space is defined between the sets of drive and guide rollers on either side of the center rail 18 for receiving the center rail. Without the guide rollers 82, the drive unit 24 may rotate about the center rail 18, as well as about a vertical axis. Any rotation about the center rail 18 would create an undesirable torque on the flexible coupling 28 between the drive unit 24 and the camera support unit 26. Any rotation about a vertical axis would result in improper tracking of the drive unit 24 on the center rail 18 which would in turn cause undesirable vibration and noise.

With the drive rollers 58 and 60 disengaged and the drive unit 24 decoupled from the camera support unit 26, the entire drive unit 24 may be lifted off the center track 18. Thus it can be seen that with the design of the clamping drive rollers 58 and 60 and the guide rollers 82 with quarter round contact surfaces, the drive unit 24 can be easily placed on or removed from the track without any separate tools.

A free spinning support roller 86 (see FIG. 2 and FIG. 3) is provided which is configured to rotate about a horizontal axis. This support roller 86 is positioned such that it does not roll on the center rail 18 when the drive unit 24 is coupled to the camera support unit 26. When the drive unit 24 is detached from the camera support unit 26 (details of which will be discussed below) or when the drive rollers 58 and 60 are disengaged from the center rail 18, the support roller 86 contacts and rolls on the center rail 18. This supports the structure of the drive unit 24 from toppling.

A bi-directional motor 88 (such as a 3-phase brushless motor) is provided to drive the drive roller 60. The drive roller 58 is free spinning. A two-stage reduction gear at 5.8:1 ratio provides the necessary torque and power to drive the drive rollers 58 and 60 to propel the dolly 10 at a desired speed. With the dolly configuration disclosed herein, the dolly 10 can achieve a linear speed of 18 feet per second or more along the track 12.

Figure 8:
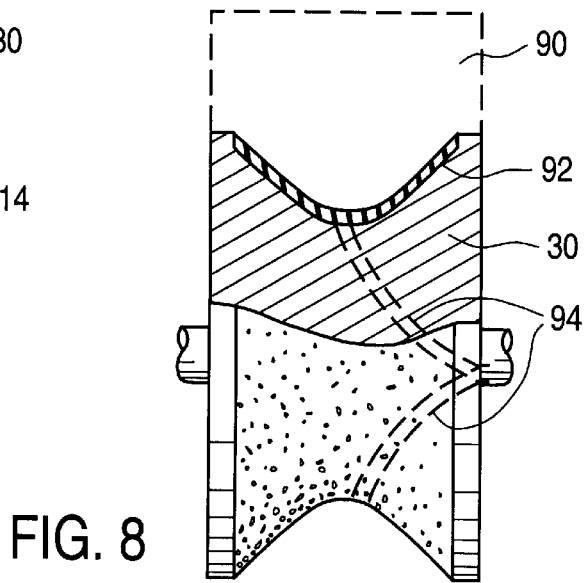
FIG. 8 is a partial sectional view taken along line 8—8 in FIG. 7.

All the wheels and rollers described above are mounted to rotate about bearings with no free play. The wheels and rollers are preferably made of aluminum or hard plastic, and are provided with a resilient contact surface to absorb some of the shocks and vibrations from rolling motions. The contact surfaces are preferably rubberized by coating with a "Shore 90" urethane material. Taking wheel 30 as an example and referring to FIG. 8, this may be done by spin molding the coating material 92 against a mold form 90 shown in phantom in FIG. 8. The fluid coating material 92 may be introduced into the mold through channels (shown by dotted lines 94) leading from the axle of the wheel or roller. Other coating methods may be implemented without departing from the scope and spirit of the present invention.

Referring to FIG. 9, the flexible coupling 28 between the drive unit 24 and the camera support unit 26 will be described. In the specific embodiment shown, the flexible coupling 28 provides two degrees of freedom about the horizontal and the vertical axes. It comprises segments connected at three hinges, including two vertical hinges 95 and 96, and one horizontal hinge 98. The end of the drive unit 24 is coupled to a coupler segment 100 at the vertical hinge 95. The coupler segment 100 is coupled to a transition segment 102 at the vertical hinge 96. An attachment plate 104 is coupled to the transition segment 102 at the horizontal hinge 98. The hinges include appropriate bearings with no free play. The attachment plate 104 is configured for quick release coupling to the camera support unit 26 (see also FIG. 1). It includes a flange 105 which can be locked against the end of the camera support unit 26, in accordance with a conventional cam and dove tail type quick-release locking mechanism as seen in FIG. 1

With the flexible coupling 28 in place, the drive unit 24 pulls and pushes the camera support-unit 26 along the track 12, as driven by the drive rollers 58 and 60. The motor 88 may be controlled by a convention motor controller or the controller 47 in accordance with the present invention (discussed below) to obtain the desired speed and direction of travel. As can be appreciated, the two FIG. 9 vertical hinges 95 and 96 of the flexible coupling 28 allow for a smooth bend to accommodate the turning of the drive unit 24 with respect to the camera support unit 26 as required when the dolly 10 negotiates a curve. Without two vertical hinges, there would not be sufficient flexibility for a smooth turn. The horizontal hinge 98 accommodates any variation in the horizontal attitudes of the drive unit 24 and the camera support unit 26. If so desired, the flexible coupling 28 may be detached from the camera support unit 26 and the drive unit 24 removed from the track 12. The camera support unit 26 is then freed to be manually pushed along the track 12.

Figure 7:
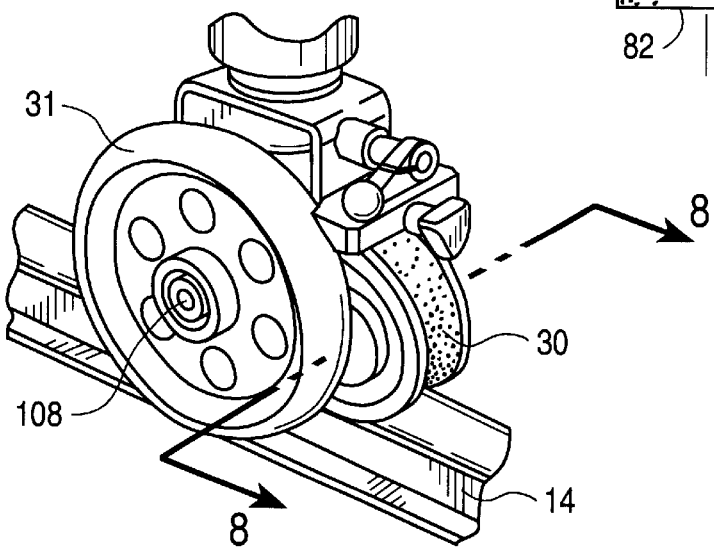
FIG. 7 is a perspective view of the wheel of the camera support unit of the camera dolly.

Referring to FIG. 7, at each corner of the camera support unit 26, in additional to the pair of wheels 30, a free spinning wheel 31 is provided which does not ride on the rail 14 or 15. Its axle 108 is positioned such that its circumferential surface is above the surface on which the rails 14 and 15 support. The wheels 31 are for facilitating supporting and moving the camera support unit 26 when it is off the track 12.

The motion of the dolly 10 may be coupled to the telescopic motions of the camera support unit 26, as well as to the zoom, focus, pan and tilt motions of the camera. These motions may be coordinated and controlled by known means in the art, or by the controller 47 (FIG. 1) of the present invention (discussed later).

In a further aspect of the present invention, the motions of the dolly 10 and the camera 40 may be memorized and playbacked to repeat the same motions over and over again. This is useful, for example, in composite photography. Composite photography requires two scene elements that were separately shot to be composited into a single scene. This requires that such two scene elements be consistent with respect to camera motions so that they can be perfectly matched to obtain the composite scene.

Figure 13:
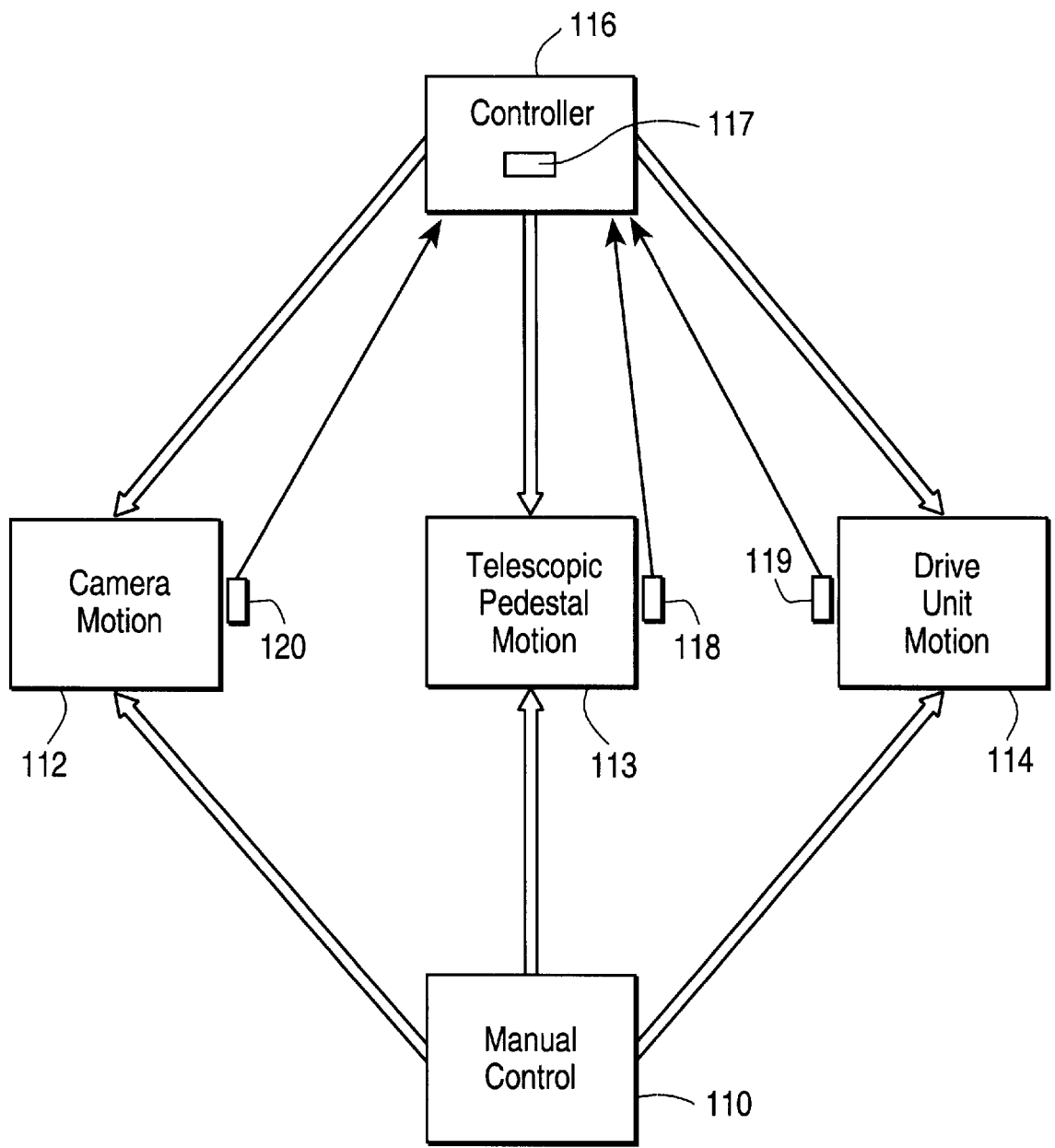
FIG. 13 is a schematic block diagram of a motion control system in accordance with a further aspect of the present invention.

For example, to obtain the scene of a lion ferociously pursuing a person in a jungle, it would be desirable to film the person running scene element separate from the lion running scene element. FIG. 13 is a schematic diagram of a motion control system in accordance with the present invention. The motions of the various components are dynamically controlled by an user (manually by means of one or more actuators 110, which may be a variable pot, for example) to shoot the person running from one point to another in the jungle. The user can dynamically adjust the camera motions 112 and dolly motions 113 and 114 in accordance with the actual performance of the person. The actual movements of the components are memorized electronically in a memory 117 of a control unit 116, which may be a computer, for example. Encoders 118, 119 and 120 are provided to obtain the positions of the telescopic extensions 113, drive unit motor rotations 112, camera motions 114 (tilt, pan, zoom, focus, etc.) (The use of encoders for position and movement feedbacks when taken alone do not form a part of the present invention. As such, the details of such encoders and associated electronics, such as analog-to-digital converters, are not discussed here so as not to obscure the present invention.) The director may view the scene in real time during the running sequence to see if the desired scene is captured by the camera 40 (e.g., camera angle, position, and motion). If the sequence is not acceptable, the sequence is repeated and the movements of the components rememorized.

When a sequence is acceptable, the memorized movements will be used for repeating this sequence at a later time. Specifically in this example, the same camera motions 112 and dolly motions 113, and 114 are repeated at a later time without further manual control to shoot the running of the lion to match the earlier running of the person by means of a composite photography process to obtain the composite scene of the lion pursuing the person. The camera motions 112 and dolly motions 113, and 114 are controlled by the controller 116 in accordance with the memorized sequence. Controller 47 of FIG. 1 may be controller 116 of FIG. 13. Computer controls of dolly motion and camera motion by themselves are in large part similar to the state of the art motion controls for similar devices, with the exception that the motion control sequence in accordance with the present invention was not preprogrammed by direct user input, but is taken from memory of a prior scene in accordance with the present invention.

With the help of composite photography, the shooting of the lion running may be done in a scene element controlled area away from the jungle (e.g., in a studio with the necessary matte backing, etc. for composite photography). Thus, the tracks 12 for the dolly 10 may be disassembled and moved from the first location (the jungle) to another (the studio) where the same exact sequence may be shot under computer control in accordance with the memorized sequence of movement. The two separately shot scenes may then be seamlessly matched into a single composite scene.

Owing to the structure of the dolly of the present invention, the motions of the dolly 10 is vibration and noise free and closely repeatable under computer control for a quality matched composite picture. Hysteresis in the mechanical system may be kept to a minimum. The motion control of the earlier scene element (person running) may be dynamically obtained in real time by manual control so as to accommodate the actual movements in the scene. This is advantageous over user preprogramming the motion control sequence without the benefit of accommodating actual movements in the scene.

It would be appreciated that the software required for the motion control in the present system can be written without undue experimentation, given the disclosure herein of the desired functions in accordance with the present invention. One example of a software package which may be adapted to perform the functions stated herein is the motion control software developed by Lynx Robotics, Inc.

While the invention has been described with respect to the illustrated embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

What is claimed is:

1. A method of shooting a scene in a motion picture, comprising:

(i) providing a track with two outer rails and a center rail, the center rail disposed between the two outer rails and the center rail having a top, a first side, and a second side;

(ii) providing a self-propelled camera positioning device, the self-propelled camera positioning device including
a camera support unit having a plurality of wheels and a camera, and
a drive unit coupled to the camera support unit, the drive unit having at least one drive roller, two guide rollers positioned adjacent to the at least one roller, means for biasing the guide rollers against the first side and the second side of the center rail, means for rotating the at least one drive roller, and means for indicating a motion of the camera support unit;

(iii) positioning the two guide rollers about the first side and the second side of the center rail;

(iv) positioning the plurality of wheels on the two outer rails;

(v) moving the camera support unit along the track to define information of the motion;

(vi) storing the information of the motion;

(vii) engaging the at least one drive roller to the first side of the center rail; and (viii) shooting a scene by operating the camera while moving the camera support unit along the track as a function of the stored information of the motion.

2. The method of claim 1, wherein the means for biasing includes at least one pivot, the means for rotating includes a motor, the means for indicating includes at least one encoder, and the motion of the camera support unit includes at least one of position and movement, wherein
providing a self-propelled camera positioning device includes providing a self-propelled camera positioning device having two drive rollers, and wherein
engaging the at least one drive roller to the first side of the center rail includes engaging one of the two drive roller to the first side of the center rail and engaging the other of the two drive roller to the first side of the center rail.

3. The method of claim 1 further comprising:
repeating (vii) through (viii) as a sequential series one or more times.

4. A self-propelled camera positioning device for riding on a track having two parallel outer rails and a center rail, the center rail disposed between the two outer rails and the center rail having a top, a first side, and a second side, the device comprising:
a camera support unit having a plurality of wheels and a camera, said plurality of wheels adapted to be disposed adjacent to the two outer rails of the track;
a drive unit coupled to the camera support unit, the drive unit having
at least one drive roller,
two guide rollers positioned adjacent to the at least one roller, means for biasing the guide rollers against the first side and the second side of the center rail, means for rotating the at least one drive roller, and means for indicating a motion of the camera support unit.

5. The device of claim 4, wherein the means for biasing includes at least one pivot, the means for rotating includes a motor, and the means for indicating includes at least one encoder.

6. The device of claim 4, wherein the at least one drive roller includes two drive rollers.

7. A method of positioning a camera along a track having two parallel outer rails and a center rail, disposed between the two outer rails and the center rail having a top, a first side, and a second side, the method comprising:

supporting a camera on a chassis;

coupling at least one drive roller to the chassis;

positioning two guide rollers adjacent to the at least one roller;

biasing the two guide rollers against the first side and the second side of the center rail; and engaging the first side of the center rail of the track with the at least one drive roller;

moving the chassis along the track by rotating the at least one drive roller against the center rail.

8. The method of claim 7, wherein the chassis includes a drive unit coupled to a camera support unit, the method further comprising:

recording the movement of the chassis along the track.

9. The method of claim 8, wherein moving the chassis along the track includes replaying the recorded movement of the chassis along the track.

* * * * *